US005471863A

United States Patent [19]

Hornung

[11] Patent Number: 5,471,863

[45] Date of Patent: Dec. 5, 1995

[54] PRECISION CRIMPING APPARATUS

[75] Inventor: Craig W. Hornung, Harrisburg, Pa.

[73] Assignee: The Whitaker Corporation, Wilmington, Del.

[21] Appl. No.: 223,353

[22] Filed: Apr. 5, 1994

[51] Int. Cl.[6] .......... A01R 43/055

[52] U.S. Cl. .......... 72/402; 72/424; 29/753

[58] Field of Search .......... 72/402, 410, 452, 72/424; 29/753, 751

[56] References Cited

U.S. PATENT DOCUMENTS

| | | | |
|---|---|---|---|
| 3,159,197 | 12/1964 | Anderson | 72/402 |
| 3,167,107 | 1/1965 | Ustin | 72/402 |
| 3,170,501 | 2/1965 | Ustin | 72/402 |
| 3,833,993 | 9/1974 | Kremkau | 29/753 |
| 3,956,918 | 5/1976 | Rao | 72/402 |
| 4,774,762 | 10/1988 | Gobeil | 29/861 |
| 4,835,855 | 6/1989 | Eaton | 72/753 |

OTHER PUBLICATIONS

IS 7516 AMP Screw–Machine Contacts and Application Tooling Pages 1, 12, 13, and 14, Dec. 3, 1990.

*Primary Examiner*—Daniel C. Crane

[57] ABSTRACT

The present invention is a crimping tool that utilizes a die member having a die opening for receiving a terminal therein to be crimped. The tool includes a crimping station that is within the die opening. The terminals are arranged on a carrier strip and are automatically fed into crimping position within the opening of the die while the terminal remains in position on the carrier strip. The feeding mechanism pivots the strip of terminals away from the crimping dies, feeds the strip of terminals one position, and then pivots the strip back into position so that the next terminal is moved into crimping position within the crimping die opening. A single cam member is provided that is moved by a linear actuator, such as an air cylinder, and effects and controls all functional operating motions for the mechanisms of the tool, including actuating the crimping dies and operating the terminal feed mechanism.

16 Claims, 10 Drawing Sheets

PRECISION CRIMPING APPARATUS

The present invention relate to apparatus for crimping terminals onto the ends of electrical conductors including apparatus arranged to automatically feed terminals arranged on a carrier strip into the crimping station within the die assembly.

BACKGROUND OF THE INVENTION

Machines that automatically feed electrical terminals that are arranged on a carrier strip into a crimping apparatus for crimping onto an electrical conductor typically employ a notched crimping die assembly wherein the strip of terminals is fed laterally through the notch into the crimping station between the crimping dies. A typical crimping die assembly is shown in FIGS. 1 and 2. There, a die holder 2 is shown having four equally spaced die ways 3 formed therein, each of which contains an indentor 7 having a crimping die 5 on its end extending into a crimping station 6, as shown in FIG. 2. An actuating ring 7 is arranged around the die holder and includes camming surfaces that engage the outside ends of the indentors 4 so that when the ring is rotated with respect to the die holder, the indentors are cammed inwardly so that the crimping dies 9 converge in the crimping station 6. A notch 8 is formed through both the die holder 2 and the actuating ring 7 so that the carrier strip of terminals can be fed therethrough to bring each terminal into crimping position. This notch 8, which forms a relatively thin section 9 in the crimping die assembly, as best seen in FIG. 2, is necessary because the axes of the terminals are arranged perpendicular to the longitudinal axis of the carrier strip, so that as the carrier strip is fed, along its axis, the terminals move laterally with respect to their axes and must clear the structure of the crimping mechanism as they are fed into the crimping station. An example of such a carrier strip and terminals are shown in FIG. 3. There, a carrier strip 10 has a plurality of electrical terminals 11 held in place by means of a strip of tape 12 in the usual manner. Each terminal has an axis 13 that is perpendicular to the longitudinal axis 14 of the carrier strip. Additionally, the carrier strip 10 includes a row of rectangular openings 15 along an edge thereof that are used for feeding the strip in a crimping apparatus. A problem associated with this type of crimping die assembly is that crimping accuracy and consistency is sacrificed to some degree because the crimping forces as well as other forces internal to the machine will cause the assembly to deflect somewhat about the relatively thin section 9 during the crimping operation. The thin section 9 is made as thick as possible to minimize this deflection, however, if the section is too thick, it is more difficult to thread the conductor through the central opening 11 and into the barrel of the terminal without stubbing. Therefore, this becomes a compromise that still allows for substantial deflection during the crimping operation. Where accuracy of the crimp is essential, these types of crimping die assemblies cannot be used. In such cases a crimping die assembly without the notch is used so that the actuating ring completely encircles the crimping station 6 with no discontinuities in its peripheral surface. Such a crimping die assembly is used in a hand operated crimping tool part number 601966-1 distributed by AMP Incorporated of Harrisburg, Pa. and is illustrated in their publication IS7516. The crimping dies are arranged in the die ways of the die holder so that they converge onto the crimping station that is in the center of an opening in the holder. An actuating ring without a notch, that is, with a continuous peripheral surface, encircles the holder and the crimping station and, when rotated, will cause the crimping dies to mutually converge to crimp terminal in the crimping station. The actuating ring without the notch provides a considerably stronger crimping die assembly for more accurate crimps than does one with a notch. This type of tool, however, requires that the operator insert a terminal into a positioner within the tool, then thread the end of the electrical conductor into the opening in the terminal. This die assembly structure, while providing superior crimping performance, precludes the automatic feeding of terminals on a carrier strip along the longitudinal axis of the strip and into the crimping station without complex and costly feeding mechanisms. Such a complex crimping tool utilizing a die assembly without a notch is disclosed in U.S. Pat. No. 4,774,762 which issued Oct. 4, 1988 to Gobeil. The tool disclosed in the '762 patent utilizes terminals arranged in bandoleers that are mutually attached to form a strip. Each bandoleer is fed in turn into position in alignment with the axis of the crimping station and then the terminal is pushed out of the bandoleer into the crimping station by a push rod. This requires means for locating and positioning the loose terminal prior to and during the crimping operation, in addition to the pushing mechanism.

What is needed is a terminal crimping and feeding mechanism that utilizes the stronger die assembly without the notch while providing automatic feeding of terminals that are arranged on a carrier strip. Further, the mechanism should be economical to manufacture and simple in operation so that a single linear stroke actuator will effect all necessary crimping and feeding movements.

SUMMARY OF THE INVENTION

A tool is disclosed for crimping an electrical terminal onto the end of an electrical conductor. The tool has a frame, a crimping station within the frame and a major axis through the crimping station. The tool is of the type that receives electrical terminals spaced on a carrier strip, moves the strip to position a terminal within the crimping station, and removes the terminal from the carrier strip after crimping onto the conductor. The tool has a crimping die assembly including a die member that encircles the crimping station. A plurality of die ways are formed in the die member and a plurality of crimping dies are arranged in the die ways to move toward the crimping station and into crimping engagement with a terminal in position therein. A die actuating member encircles the die member and the crimping station and is arranged to effect the movement of the crimping dies within the die ways. A terminal feed mechanism is arranged to move the carrier strip so that a terminal is moved into position in the crimping station.

DESCRIPTION OF THE PREFERRED EMBODIMENT

Figure 4:
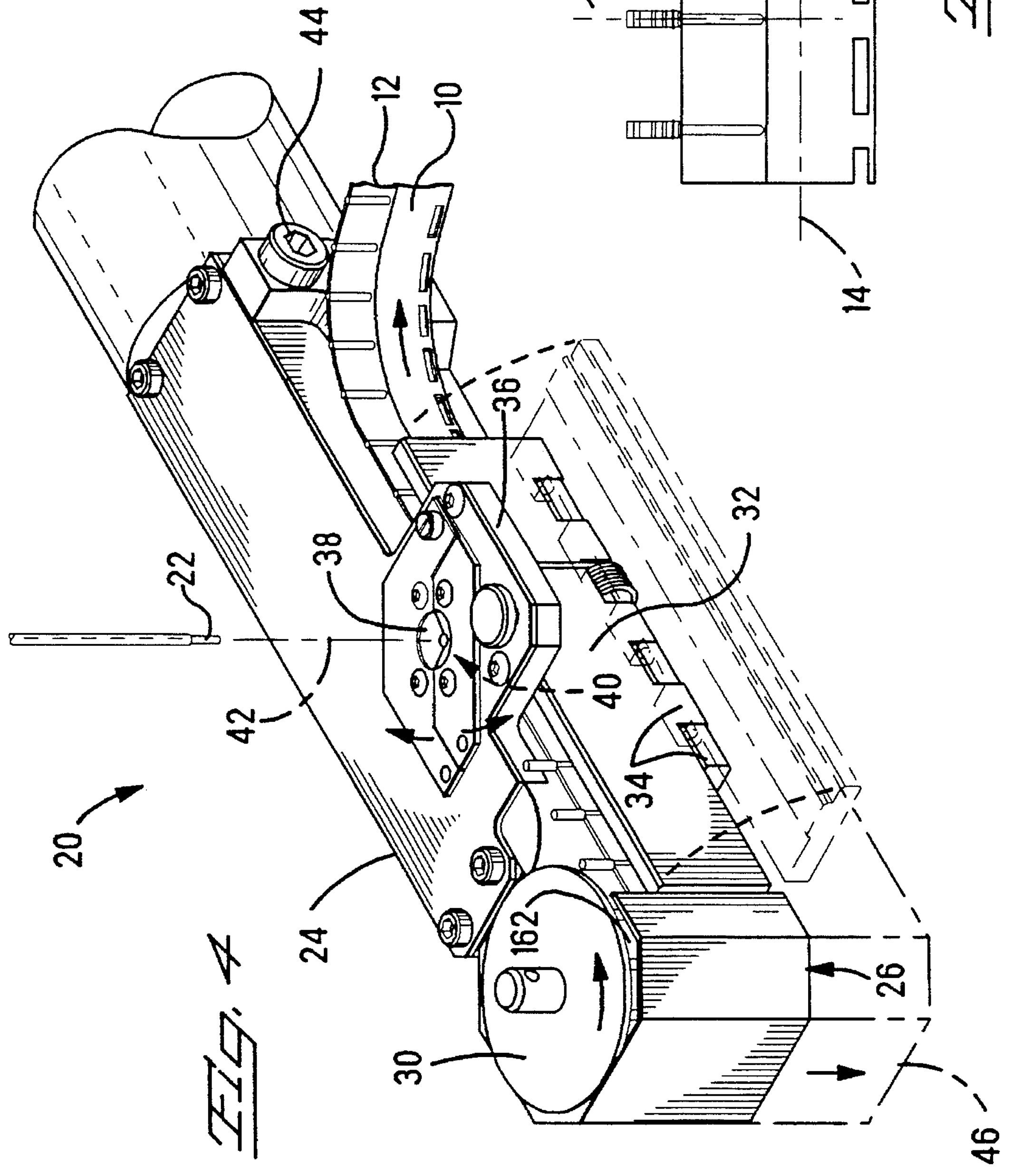
FIG. 4 is an isometric view of a crimping tool incorporating the teachings of the present invention.

There is shown in FIG. 4 a crimping tool 20 for crimping a terminal 11 onto the end of an electrical conductor 22. The tool 20 has a main housing 24, a terminal feed mechanism 26, and a linear actuator 28, which in the present example is an air cylinder, that provides the motion for operating the tool. As shown in FIG. 4, the carrier strip 10 and attached terminals 11 are coiled about a spool 30 that is arranged at one end of the terminal feed mechanism and fed along the side of the tool and held in place by a spring loaded door 32 that is hinged to the housing 24 by means of the hinge 34. A crimping assembly 36 having an opening 38 extends from the main housing 24 so that the opening is encircling a crimping station 40. The crimping station 40, being within the opening 38 has a major axis 42 that extends through the center of the opening and is coaxial with the axis 13 of a terminal 11 that is in crimping position within the crimping station. The terminal feed mechanism 26 is pivotally attached to the main housing 24 by means of a shoulder screw 44 which allows the mechanism to pivot downwardly to the position shown in phantom lines at 46 in FIG. 4 during feeding of the strip of terminals. When the axis 13 of the terminal 11 is in alignment with the major axis 42 the terminal feed mechanism 26 is pivoted upwardly to its position shown in solid lines in FIG. 4. This moves the terminal 11 into crimping position within the crimping station 40. This general description of the tool 20 and its operation will now be expanded and set forth in more detail below.

Figure 7:
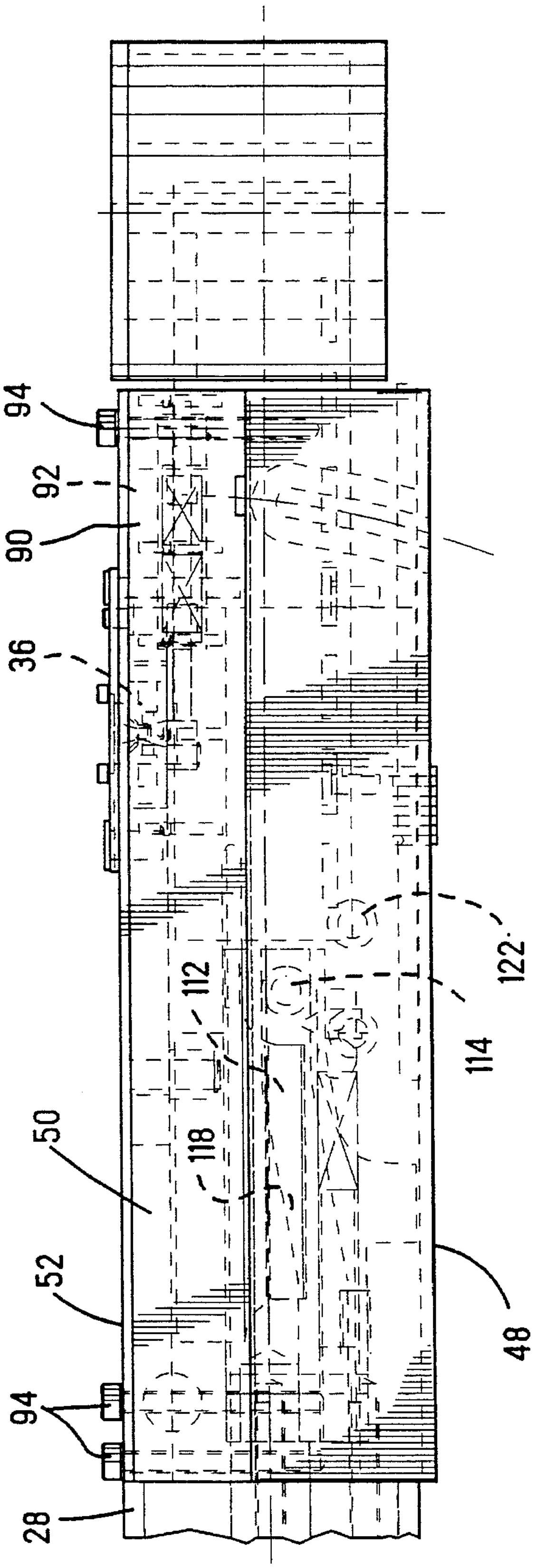
FIG. 7 is a front view of the tool shown in FIG. 5.
Figure 10:
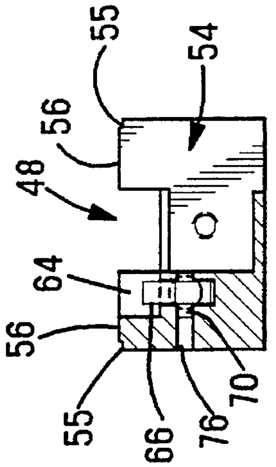
FIG. 10 is a cross-sectional view taken along the lines 10—10 in FIG. 8.
Figure 9:
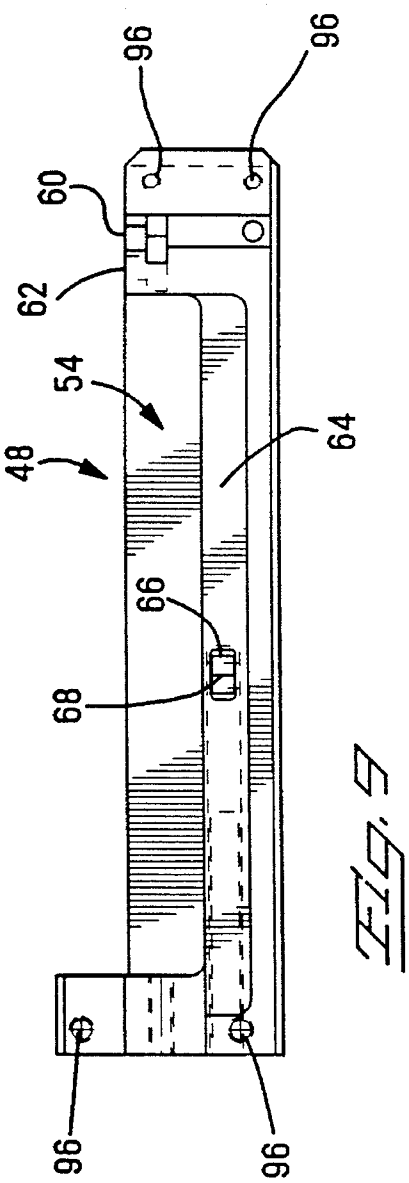
FIGS. 8 and 9 are front and top views, respectively of the lower portion of the housing.
Figure 8:
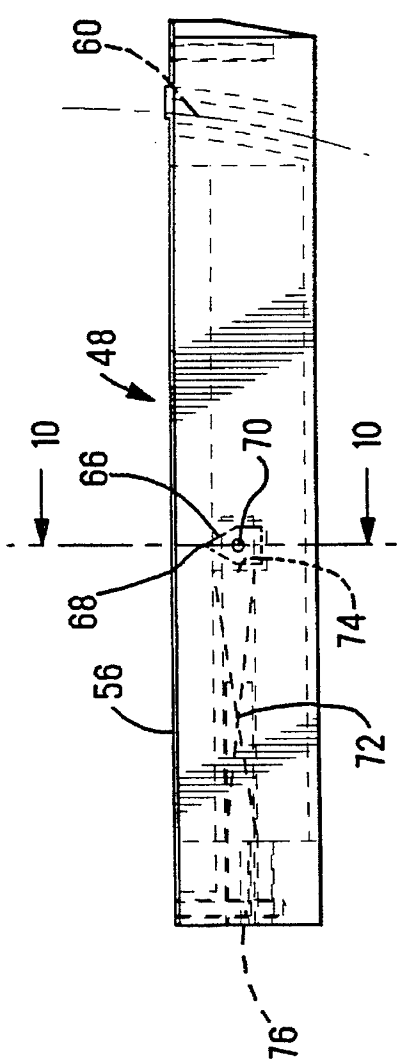
Figure 13:
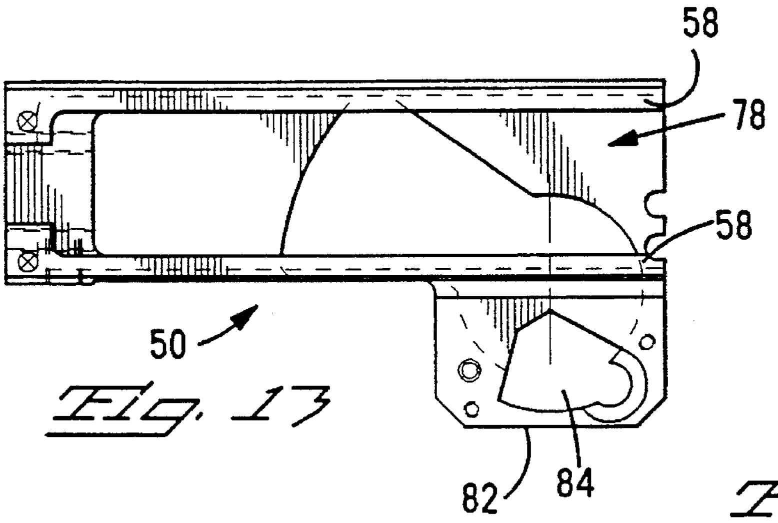
FIGS. 11, 12, 13, and 14 are top, front, bottom, and side views, respectively, of the upper portion of the housing.
Figure 14:
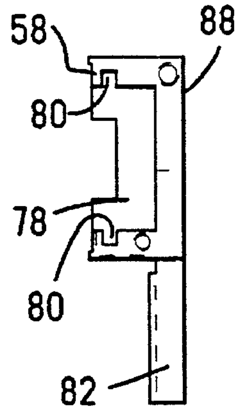
Figure 12:
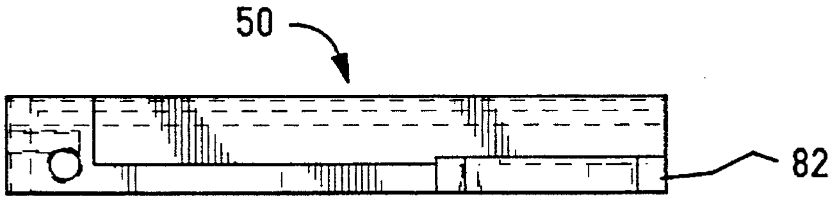

As shown in FIG. 7 the main housing 24 includes a bottom housing 48, a top housing 50 and a top plate 52. The bottom housing 48, as best seen in FIGS. 8, 9, and 10 is generally of elongated shape and having a cavity 54 formed therein. A pair of rabbets 54 are formed in the opposite edges of a surface 56 and mate with a recessed surface 58 in the top housing shown in FIG. 14. A T-slot 60, as shown in FIG. 9, is formed in a surface 62 of the bottom housing along an arcuate path, as best seen in FIG. 8, for a purpose that will be explained. A relatively deep groove 64 is disposed along one edge of the surface 56 and includes an opening 66 containing a pawl 68 that is pivotally attached therein by means of a pin 70. The pawl extends above the floor of the groove 64 a slight amount and is spring biased in a neutral position by a spring 72 and ball 74 that are held in a bore by a set screw 76. The tip of the pawl 68 that extends above the floor of the groove 64 may be pivoted in either direction past its neutral position against the biasing force of the spring 72 for a purpose that will be explained below.

Figure 11:
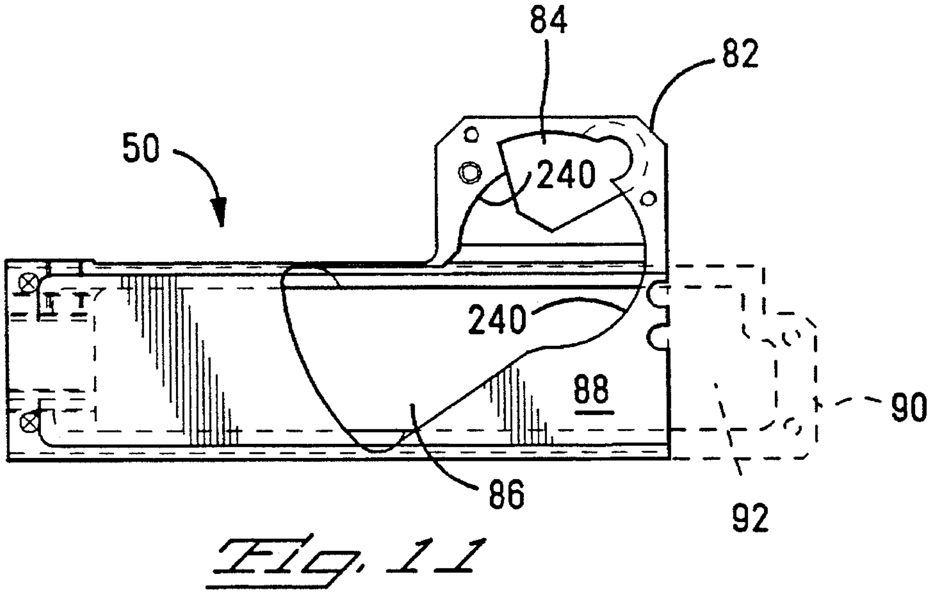

The top housing 50, as best seen in FIGS. 11 through 14, includes an elongated recess 78 formed in the surface 58 and a pair of grooves 80 formed in the side walls of the recess that run the length thereof. A rectangular extension 82 extends cantilever fashion from one side and end of the top housing and includes an irregularly shaped opening 84 therethrough. The crimping mechanism couples to this extension as will be described below. Another irregularly shaped opening 86 is formed through the top surface 88 of the top housing and into the recess 78 and extends into but not through the extension 82, as best seen in FIG. 11. An end member 90, shown in solid lines in FIG. 7 and in phantom lines in FIG. 11 mates with both the end of the top housing 50 and the surface 56 of the bottom housing 48 and includes an internal recess 92 therein that generally conforms with the size and shape of the recess 78. The top plate 52 is positioned against the top surface 88 of the top housing 50 and four screws 94 extend through clearance holes in the top plate, the end member, and the top housing and into threaded holes 96 formed in the bottom housing 48 to hold the entire main housing together.

Figure 5:
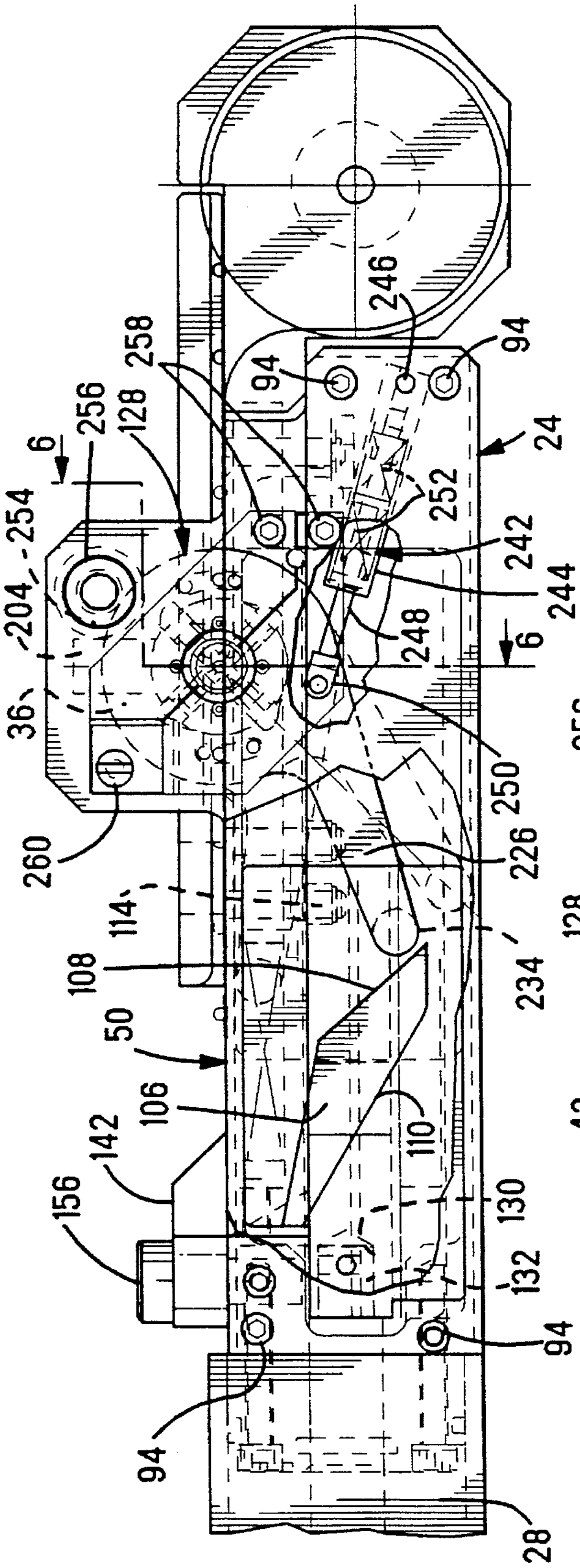
FIG. 5 is a plan view of the tool shown in FIG. 4.
Figure 6:
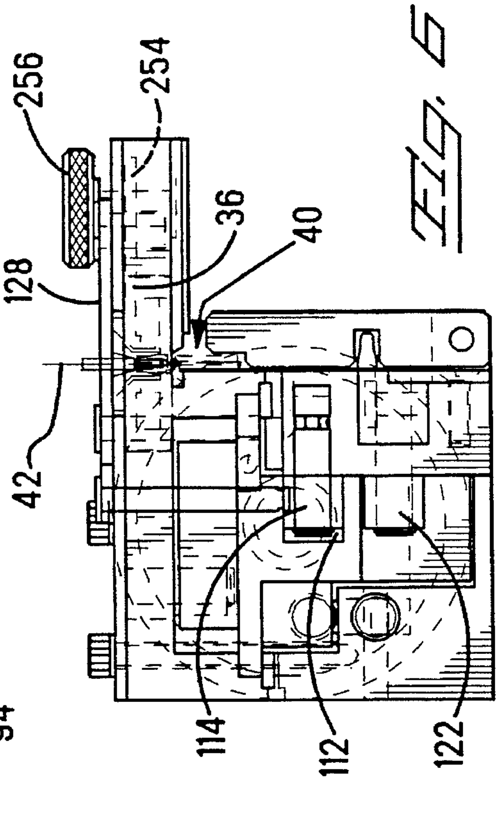
FIG. 6 is a cross-sectional view taken along the lines 6—6 in FIG. 5.
Figure 17:
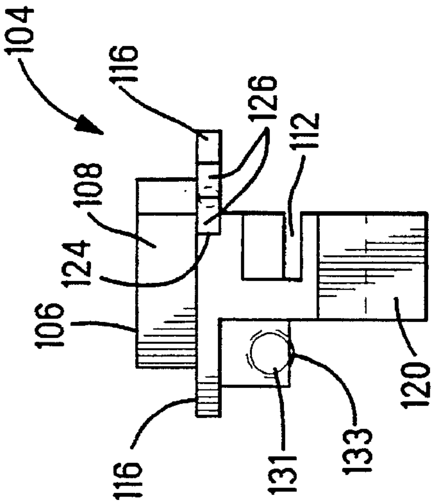
FIGS. 15, 16, and 17 are front, top, and side views, respectively, of the cam shown in FIG. 5.
Figure 16:
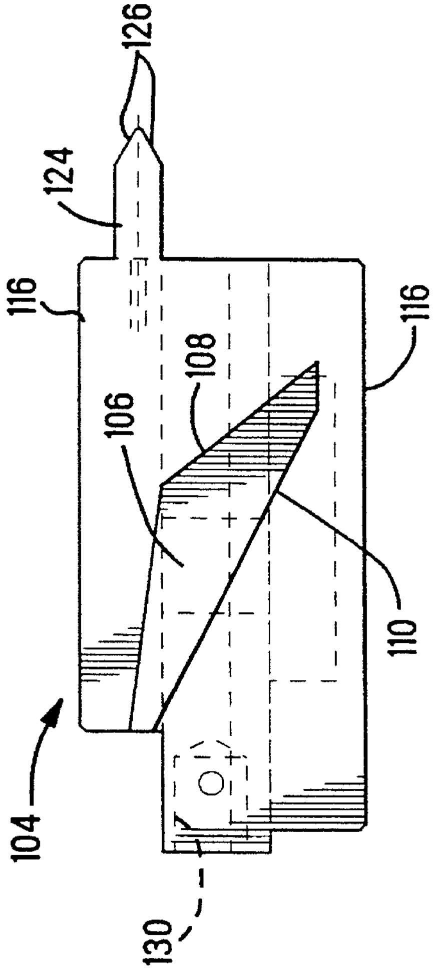
Figure 15:
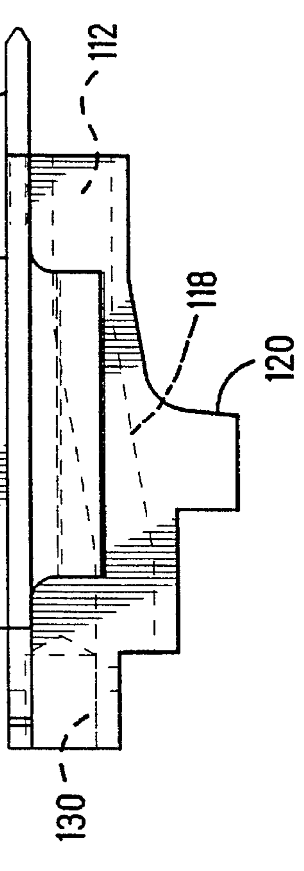

A cam member 104, as best seen in FIGS. 15, 16, and 17 includes a cam 106 having a first cam surface 108 and a second cam surface 110. A cam track groove 112 is formed in one side of the cam member 104 and sized to receive a cam track follower 114 that is part of the terminal feed mechanism 26 shown in FIG. 19 and that will be described below. A pair of flanges 116 extend outwardly from opposite sides of the cam member 104 and are a slip fit with the pair of grooves 80 in the top housing 50 so that the cam member is free to slide back and forth within the cavity 78, but constrained by the grooves 80. A portion 118 of the cam track 112 is inclined with respect to the flanges 116 and their guiding grooves 80. An abutting surface 120 on the lower side of the cam member 104 is arranged to abut a roller 122 that is coupled to a portion of the feed mechanism shown in FIG. 22 and that will be described below. A bayonet 124 having a tapered nose 126 extends from the leading edge of the cam member 104 and is used to actuate a funnel type wire guide mechanism 128, as best seen in FIG. 5. A bore 130 is formed in the end of the cam member opposite the bayonet 124, as shown in FIGS. 15 and 16, and is sized to closely receive the piston rod 132 of the cylinder 28, which is pinned to the cam member 104 with a pin 134, as best seen in FIG. 5. The cam 104 includes a screw 131 threaded into a hole formed therein so that the threads of the screw break out along one side and form serrations 133 that are downwardly facing. When the cam member 104 is in position within the main housing the serrations 133 cooperate with the pawl 68 to prevent reversal of movement of the cam member except at either end of its stroke.

Figure 19A:
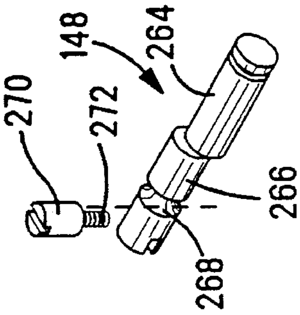
FIG. 19A is an isometric view of an eccentric pin used in the invention.
Figure 20:
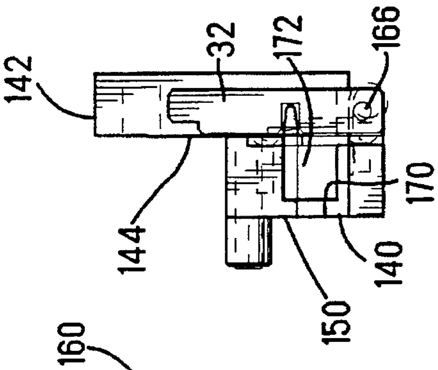
FIG. 20 is a cross-sectional view taken along the lines 20—20 in FIG. 18.
Figure 19:
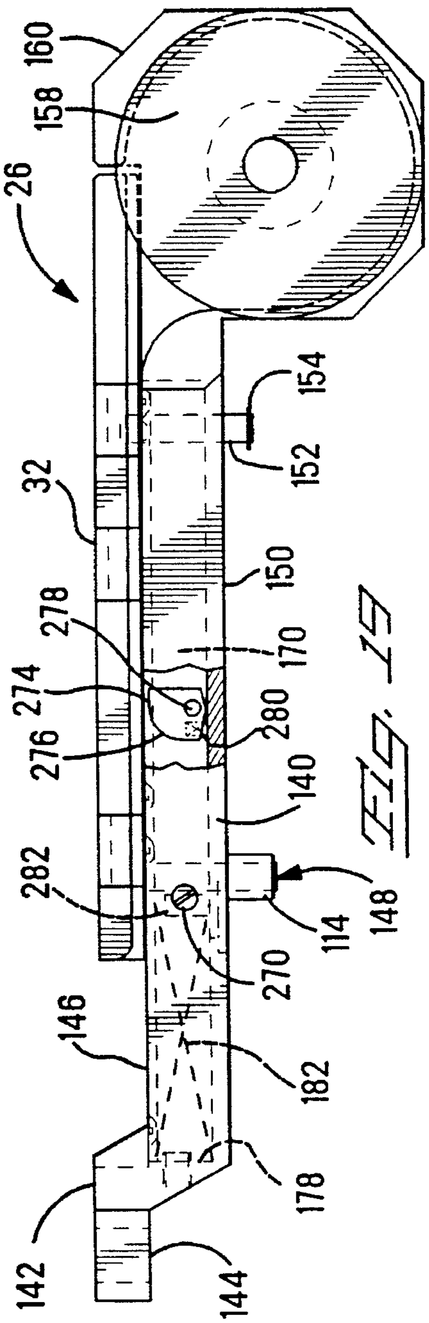
FIGS. 18 and 19 are front and top views, respectively of the carrier strip feed mechanism.
Figure 18:
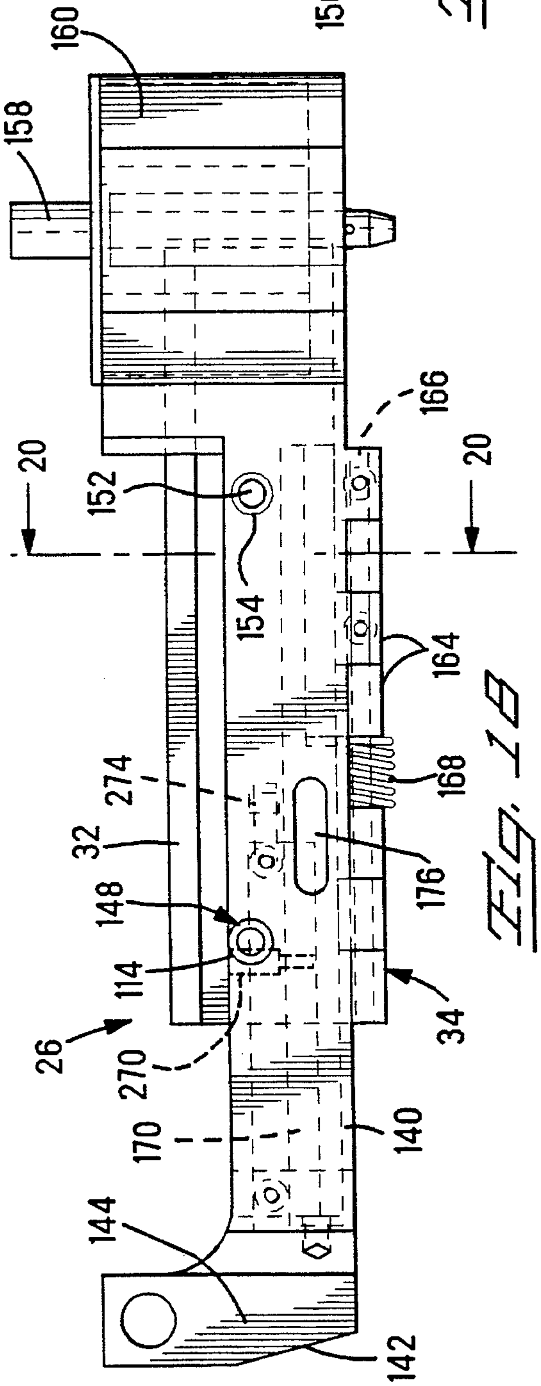
Figure 23:
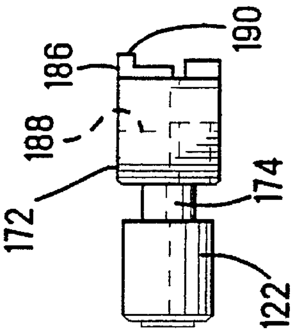
FIGS. 21, 22, and 23 are front, top, and side views, respectively, of the feed slide assembly shown in FIG. 20.
Figure 22:
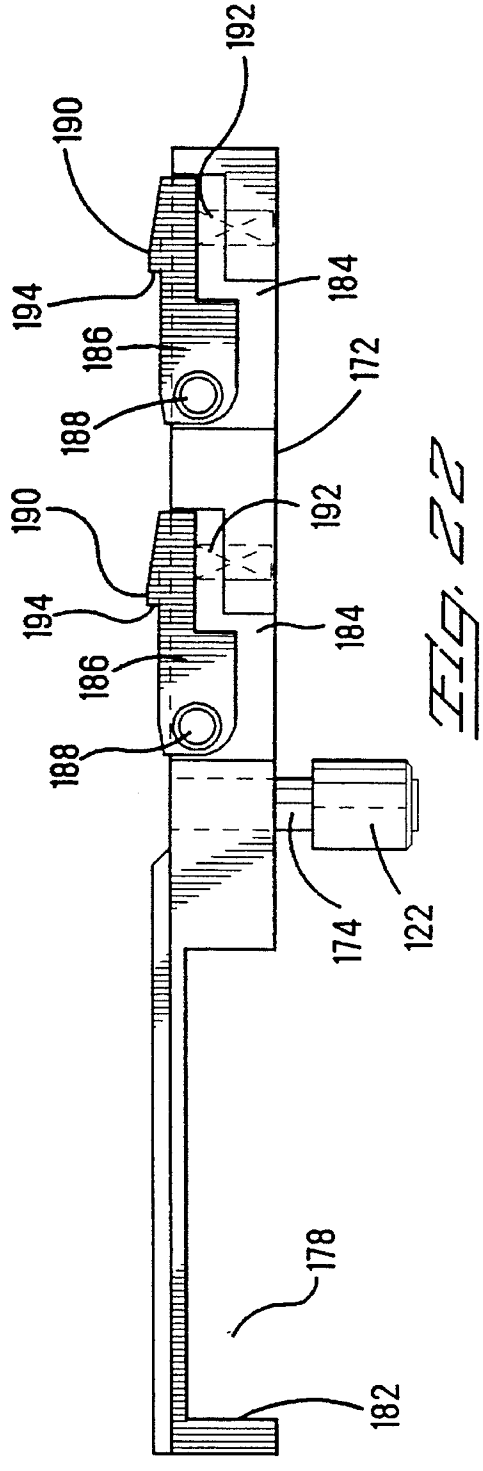
Figure 21:
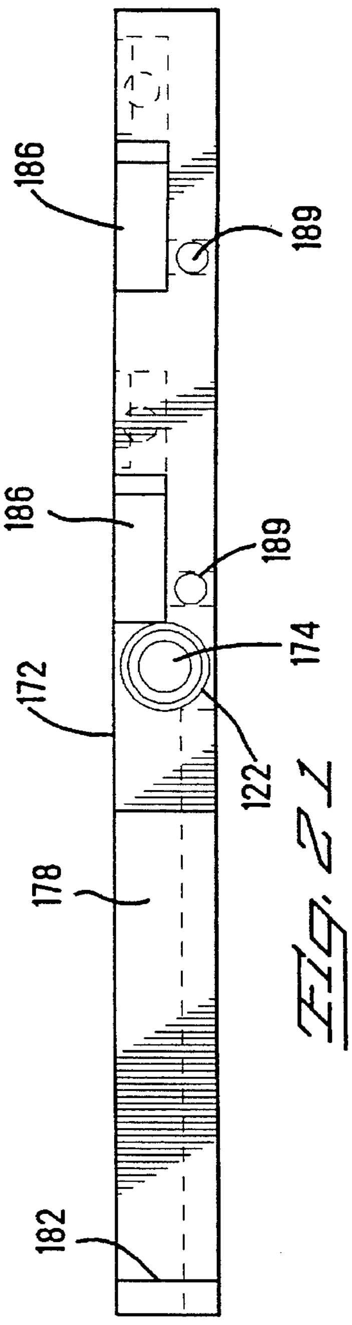

The terminal feed mechanism 26, as shown in FIGS. 18, 19, and 20, includes a frame 140 having an off-set flange 142 with a mounting surface 144 that is in substantial alignment with a surface 146 which is used to locate and help guide the movement of the carrier strip 10, as will be explained. The cam track roller 114 is journaled for rotation on an eccentric pin 148 that extends from a hole in the surface 150 of the frame 140 opposite to the surface 146. The eccentric pin 148, as best seen in FIG. 19A, includes a spindle 264 upon which the roller 114 is journaled and a shank 266 that is sized to be a slip fit with the hole in the surface 150. The shank 266 has several arcuate surfaces 268 equally spaced about its periphery. The eccentric pin 148 is held in the hole in the surface 150 by means of a locking pin 270, shown in FIG. 19A, having a threaded portion 272 that is threaded into a hole in the frame 140. The locking pin engages one of the arcuate surfaces to secure the eccentric pin in place. The eccentric pin 148 may be angularly positioned as desired by withdrawing the locking pin 270 from the arcuate surface 268, rotating the eccentric pin, and then reinserting the locking pin. The reason for this adjustment will be explained below. An antibackup member 274 having a knurled arcuate outer surface 276 is pivotally attached to the frame 140 by means of a pin 278. A spring 280 is arranged to urge the antibackup member 274 to pivot in a clockwise direction. The arcuate surface 276 is formed off-center with respect to the pivot pin 278 so that as the antibackup pivots clockwise it extends past the surface 146, and as it pivots in the opposite direction it withdraws from the surface 146. Therefore, as the carrier strip 10 is being fed along the surface 146, the antibackup 274 will allow the carrier strip to move only toward the off-set flange 142, thereby preventing possible inadvertent backup of the carrier strip during feeding. A pin 152 is pressed into a hole in the surface 150 and extends outwardly from the surface and has a retaining ring 154 in a groove near its free end. As shown in FIG. 5, the off-set flange 142 is coupled to the side of the top housing 50 by means of a shoulder screw 156 that is threaded into a hole in the top housing. The length of the shoulder screw 156 is chosen so that the surface 144 of the off-set flange is held against the side of the top housing yet the frame 140 is free to pivot about the shoulder screw without appreciable lateral play. The pin 152 extends into the T-slot 60 and is held captive there by the retaining ring 154. The terminal feed mechanism 26 includes a removable bobbin 158 and a bobbin holder 160 that is attached to the frame 140. The bobbin is arranged to receive a length of carrier strip 10 rolled into a coil 162, as shown in FIG. 4. The carrier strip is held against the surface 146 by the spring loaded door 32 and guided to the crimping station 40. The hinge 34 is composed of interleaved ears 164 pivotally coupled with a hinge pin 166. A spring 168 is arranged about the pin in a space between two of the ears 104, as shown in FIG. 18, so that the door is urged toward the surface 146. A longitudinal groove 170 is formed in the surface 146 of the frame 140, as best seen in FIG. 20, for receiving a slide 172, as best seen in FIGS. 21, 22, and 23. The groove 170 is sized to be a sliding fit with the slide 172. The roller 122 is journaled for rotation on a pin 174 that is pressed into a hole in the slide 172. The pin 174 extends through an elongated hole 176 formed in the surface 150 of the frame 140 and past the surface 150 so that the roller 122 is positioned adjacent the surface 150. The slide 172 includes a cutout 178 containing a compression spring 180 having one end against a back wall 182 of the slide and the other end against a projection 282 of the frame 140 that extends into the longitudinal groove 170. The purpose of the spring 180 is to urge the slide 172 into its left most position within the groove 170, as viewed in FIGS. 18 and 19. As shown in FIGS. 21 and 22, the slide 172 also includes a pair of L-shaped recesses 184. Each recess contains a feed dog 186 which is pivotally attached to the floor of the recess by means of a pin 188. The pins 188 are attached to the slide 182 by means of set screws 189. Each feed dog has a tapered feed finger 190 and a compression spring 192 that urges the feed dog to pivot counterclockwise. Each feed finger 190 includes a shoulder 194 facing toward the left, as viewed in FIG. 22. The two feed dogs are positioned so that the feed fingers are on the same spacing as the rectangular openings 15 on the carrier strip 10. The thickness of the feed fingers is slightly less than the width of the openings 15 so that the feed fingers will easily enter the openings for feeding of the carrier strip.

When the terminal feed mechanism 26 is assembled to the main housing 24, as described above, the roller 114 is in following engagement with the cam track groove 112 and the roller 122 is spaced from but in the path of the abutting surface 120 of the cam member 104. Therefore, as the cam member 104 is moved from left to right, as viewed in FIG. 7, the roller 114 tracks down the inclined portion 118 of the track thereby causing the terminal feed mechanism 26 to pivot about the shoulder screw 156 to the position shown in phantom at 46 in FIG. 4. As the cam member 104 continues to move to the right, the abutting surface 120 engages the roller 122 causing the slide 172 to move within the longitudinal groove 170 toward the right. The tapered edge of the feed fingers 190 cam out of the rectangular openings 112 in the carrier strip 10 by compressing the springs 192. As the cam member 104 continues to move to the right, the feed fingers ride along the surface of the carrier strip between the rectangular openings until the next set of rectangular openings are reached at which point the feed fingers are pushed into the openings by the springs 192. By moving the cam member 104 in the opposite direction, that is to the left as viewed in FIGS. 5 and 7, the abutting surface 120 moves to the left and the spring 180 urges the slide 172 to the left so that the roller 122 follows the abutting surface 120 until the slide reaches its position shown in FIG. 17. While the slide is moving to the left the shoulders 194 of the feed fingers 190 move the carrier strip 10 one position to the left.

Figure 2:
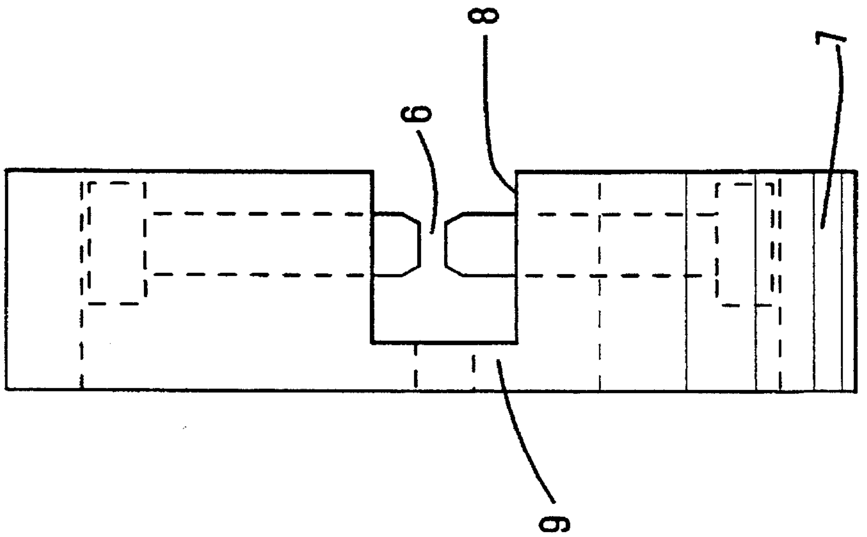
PRIOR ART Fig. 2
FIG. 2 is a side view of the assembly shown in FIG. 1.
Figure 1:
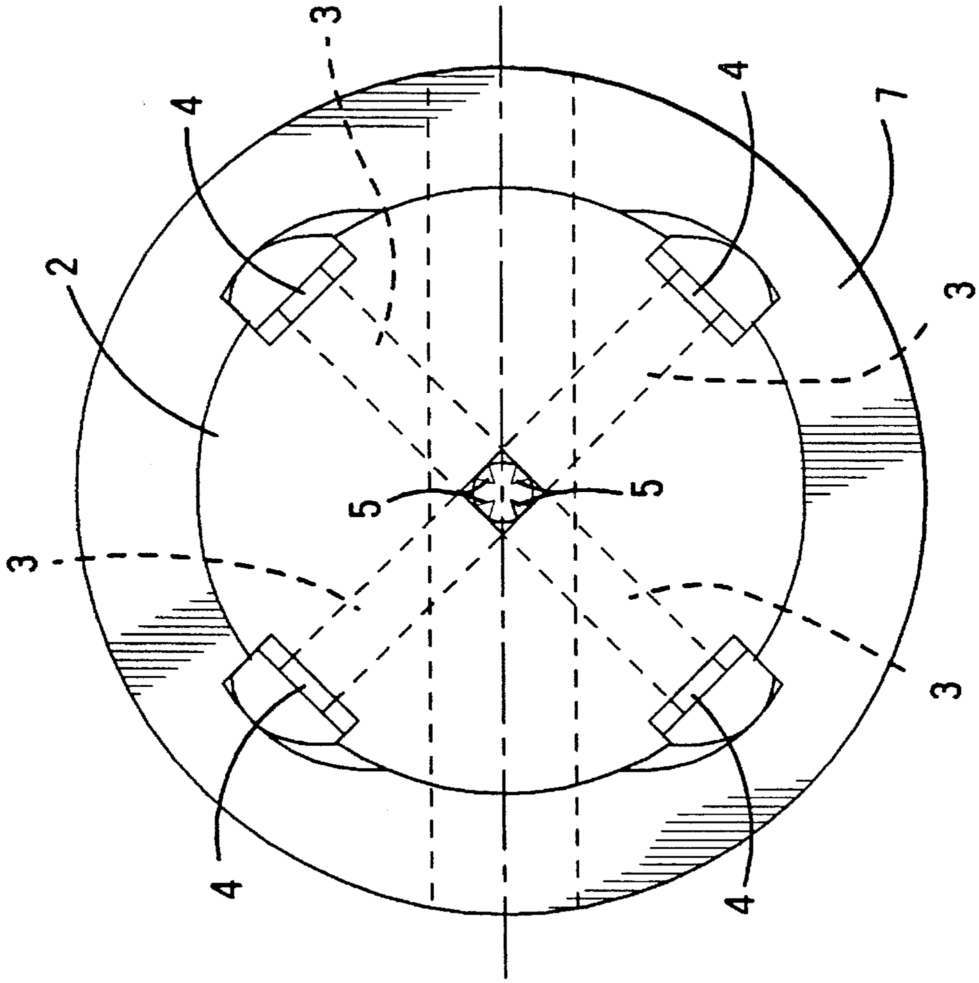
PRIOR ART Fig. 1
FIG. 1 is a plan view of a known crimping die assembly.
Figure 3:
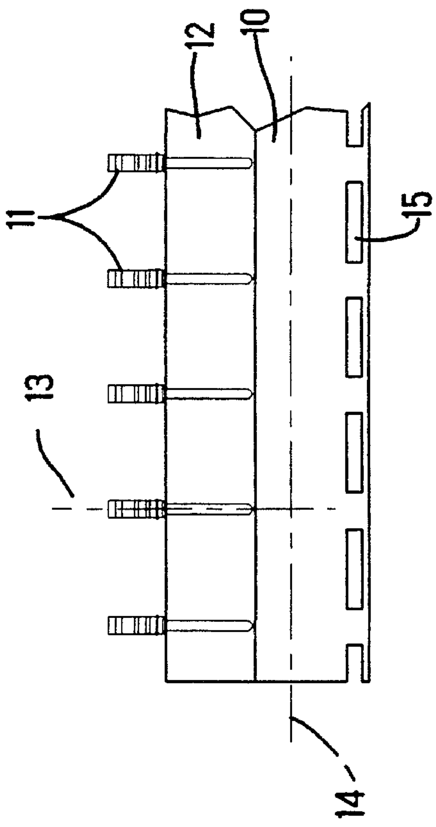
FIG. 3 is a plan view of a portion of a carrier strip and electrical terminals.
Figure 24:
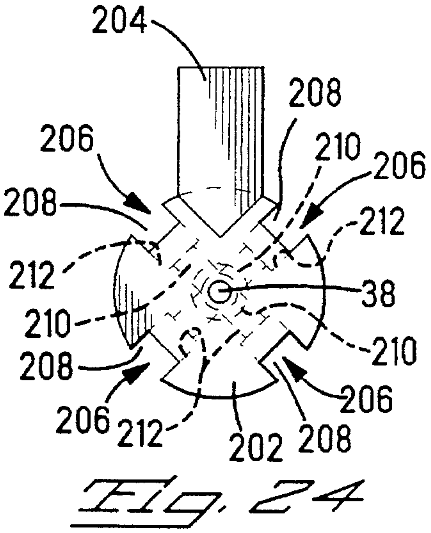
FIGS. 24 and 25 are plan and side views, respectively, of the die holder shown in FIG. 5.
Figure 25:
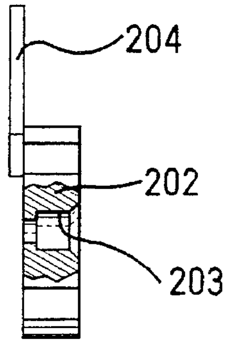
Figure 26:
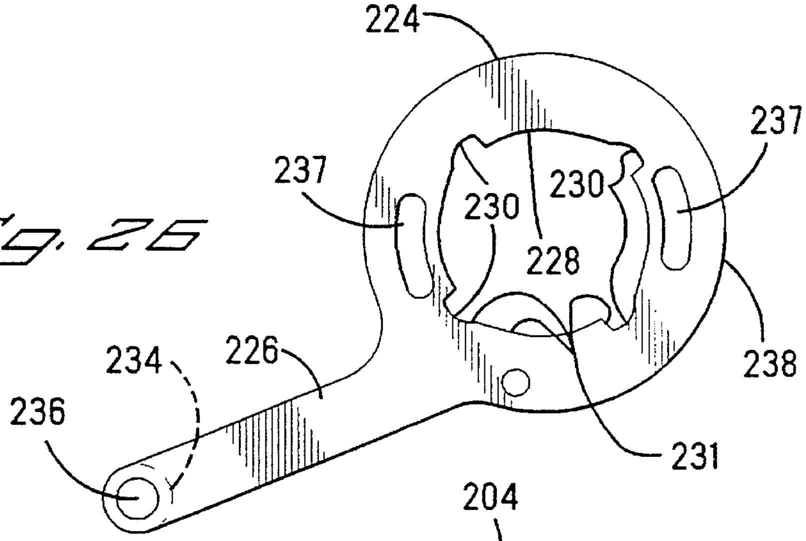
FIG. 26 is a plan view of the die actuating member.
Figure 27:
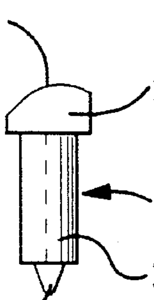
FIG. 27 is a front view of an indentor with crimping die.
Figure 28:
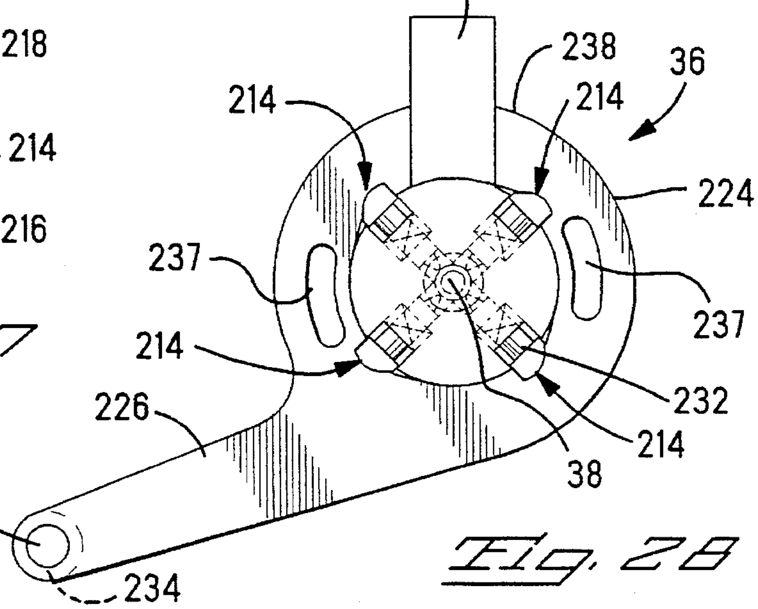
FIG. 28 is a plan view of a crimping die subassembly of the parts shown in FIGS. 24, 26, and 27.

There is shown in FIGS. 24 through 28 the crimping assembly 36 and its parts. The crimping assembly includes a die member 202 having the die opening 38 in its center and an outer diameter that is concentric with the opening 38, as seen in FIGS. 24 and 25. The wall of the opening 38 forms a continuous surface 203, as shown in FIG. 25, that completely encircles the crimping station 40, that is there is no feed notch, similar to the notch 8 shown in FIG. 2, to interrupt the surface 203. A crimp height adjustment stop member 204 extends from one side of the die member 202. Four equally spaced die ways 206 are formed in the die member. Each die way 206 includes a cutout 208 formed in the periphery of the die member, a hole 210 directed radially inwardly to intersect the centerline of the opening 38, and a counterbore 212. Each die way 206 is sized to receive an indentor 214, shown in FIG. 27. Each indentor 214 includes a shank 216, a camming head 218 and a crimping die 220. The camming head includes an outwardly facing camming surface 222. Each of the shanks 216 of the four indentors is a slip fit with the holes 210 so that the indentors are free to move radially toward and away from the centerline of the opening 38 and the crimping station 40. A die actuating member 224 having a lever arm 226 extending therefrom includes an inner diameter 228 that is a slip fit with the outer diameter of the die member 202. Four cam surfaces 230 are equally spaced about the inner diameter 228 and arranged to engage the camming surfaces 222 of the indentors 214 when the indentors are assembled in the die ways 206 and the die member positioned within the diameter 228 as shown in FIG. 28. The four cam surfaces 230 and the surface of the inner diameter 228 form a continuous inner surface 231 that completely encircles the die member 202 so that both the die actuating member 224 and the die member 202 each completely encircle the crimping station 40; therefore, there is no notch or channel formed therein to accommodate the strip of tape 12 during feeding, as in prior art mechanisms. A compression spring 232 is arranged around each shank 216 between its head 218 and the bottom of the counterbore 212 to urge the surface 222 into engagement with its respective camming surface 230. A cam follower roller 234 is journaled for rotation on a pin 236 that is rigidly attached to the end of the arm 226. This follower roller 234 is engaged by the cam 106, as will be explained. A pair of elongated arcuate holes 237 are formed through the die actuating member 224 spaced on opposite sides of the diameter 228 and serve as clearance openings for terminals 11 that may be on either side of the crimping station 40 during operation of the tool. The actuating member 224 includes an outside diameter 238 that is a slip fit with the arcuate walls 240 of the irregularly shaped opening 86, see FIG. 11. The crimping assembly 36 is arranged within the slip fit portion of the opening 86, as shown in FIG. 5, and is free to pivot therein. A self centering mechanism 242 has a housing 244 pivotally attached to the main housing 24 by means of a pin 246 and a piston rod 248 with its free end pivotally attached to the die actuating member 224 by means of a pin 250. A pair of compression springs are disposed in the housing 244, one on each side of the piston so that the piston is always urged to its center position, as shown in FIG. 5. An adjustable stop 254 is attached to and rotated by a thumb screw 256 and is arranged to abut against the crimp height adjustment stop member 204 when the die actuating member is rotated clockwise. This limits the rotational movement of the die member 206 and thereby affects the crimp height of the tool. By rotating the thumb screw 256 to a desired setting, the adjustable stop 254 is positioned with respect to the member 204, thereby effecting a desired crimp height.

In operation a coil 162 of carrier strip 10 and terminals 11 is loaded onto the bobbin 158 and inserted into the holder 160. The lead end of the carrier strip 10 is threaded between the door 32 and the surface 146 of the terminal feed mechanism 26, as shown in FIG. 4. The cylinder 28 is then cycled a few times to bring the feed dog feed fingers 190 into engagement with the rectangular openings 15 in the carrier strip, and to advance the first terminal 11 into the crimping station 40 and into alignment with the major axis 42. Since the vertical positioning of the terminal with respect to the crimping dies is critical, its position must be verified to be within acceptable tolerances. If it is not within acceptable limits the eccentric shaft 148 is adjusted, as set forth above, to bring the terminal into proper position for crimping. A prepared conductor 22 is then inserted into the opening 38 and the cylinder actuated. The piston 132 then advances the cam member 104 along the grooves 80 toward the right so that the cam surface 108 engages the roller 234, as shown in FIG. 5. As movement continues, the roller 234 tracks along the cam surface 108 thereby rotating the actuating member 224 clockwise which causes the indentors 214 to move axially in their die ways 206 toward and into crimping engagement with the terminal 11. At this point the tapered end 126 of the bayonet 124 engages a pair of pins 258 extending from the two part wire guide 128 causing the two parts to separate and pivot about a common pivot point 260, as best seen in FIG. 5, for the purpose of providing additional clearance when later removing the crimped terminal and conductor. Additionally, the roller 114 engages the inclined portion 118 of the cam track groove 112 thereby causing the entire terminal feed mechanism to pivot downwardly away from the crimping mechanism 36 toward the position shown in phantom lines in FIG. 4. Since the terminal 11 is securely gripped by the crimping dies 220, the carrier strip 10 is pulled completely away from the terminal. As the cam member 104 continues to move to the right, as viewed in FIG. 5, the abutting surface 120 engages the roller 122 causing the slide to advance the feed dog feed fingers 190 to disengage the current set of rectangular openings in the carrier strip 10 and to move to the next set. The carrier strip 10 is prevented from moving along with the feed dogs by the antibackup 274, as set forth above. As the cam member 140 approaches the end of its stroke the cam 106 completely passes the roller 234 so that the roller falls off of the left end of the cam and the actuating member 224 is rotated counterclockwise to its neutral position, as shown in solid lines in FIG. 5, by the centering mechanism 242. This releases the crimped terminal 11 which can now be removed by simply pulling the conductor 22 and attached terminal from the opening 38. After the cam member 140 reaches the end of its stroke it reverses direction moving toward the cylinder 28. This causes the bayonet 124 to withdraw from the pins 258 allowing the two part wire guide to again close together and the abutting surface 120 to retreat to the left, as viewed in FIG. 5, so that the roller 122 follows under the urging of the spring 180. As the slide moves to the left the shoulders 194 of the feed fingers 190 advance the carrier strip 10 to bring the next terminal 11 into alignment with the major. axis 42. As the carrier strip 10 is advanced the antibackup 274 simply pivots against the urging of the spring 280 out of the way. As the cam member 104 continues to move leftwardly, the roller 114 begins to track up the inclined cam track groove 118 causing the terminal feed mechanism 26 to pivot about the shoulder screw 156 bringing the terminal 11 toward the crimping station 42 within the die opening 38. As this is occurring the surface 110 of the cam 106 engages the roller 234 causing it to cam downwardly, as viewed in FIG. 5, against the urging of the centering mechanism 242 until the roller clears the right end of the cam and returns to its neutral position shown in solid lines. At this point the cam member 104 has fully retracted and the terminal 11 is in crimping position in the crimping station within the die opening. The crimping tool 20 is now ready for additional crimping operations as desired.

An important advantage of the present operation is that a crimping assembly 36 without a notch is utilized to provide a superior crimp while permitting automatic feeding of terminals by means of a carrier strip. This is made possible by the pivoting terminal feed mechanism that pivots the terminals out of the way of the crimping dies, then feeds the terminals into the next position and then pivots the terminal into the crimping station within the crimping die opening while the terminal remains in its original position on the carrier strip. Additionally, the crimping tool is economical to manufacture because all of its operating functions are effected and controlled by the linear motion of a single cam member actuated by an inexpensive air cylinder.

I claim:

1. In a tool for crimping an electrical terminal having an axis onto the end of an electrical conductor, said tool having a frame, a crimping station within said frame, a major axis through said crimping station, and being of the type that receives electrical terminals spaced on a carrier strip having a length, moves said strip longitudinally of its length to position a terminal in alignment with said crimping station, and removes said terminal from the carrier strip after crimping onto said conductor, (a) a crimping apparatus comprising:

a die member having an opening and a plurality of die ways therein intersecting said opening, said opening having a wall forming a continuous surface completely encircling said crimping station;

a plurality of crimping dies arranged in said die ways to move toward said crimping station and into crimping engagement with a terminal in position therein with its axis co-axial to said major axis;

a die actuating member having continuous inner surface completely encircling said die member and said crimping station, said die actuating member arranged to effect said movement of said crimping dies within said die ways; and (b) a terminal feed mechanism arranged to move said carrier strip substantially laterally of its length so that a said terminal is moved substantially axially along said major axis into said position in said crimping station.

2. The tool according to claim 1 wherein said die ways have longitudinal axes radially arranged with said crimping station in the center thereof and when said crimping dies undergo said movement each die moves along a respective said longitudinal axis.

3. The tool according to claim 2 wherein said die member is a solid ring having an inside opening, said crimping station being within said inside opening.

4. The tool according to claim 3 wherein said means for effecting said movement of said crimping dies includes a die actuating member having an inside diameter and said die member having an outside diameter that is a slip fit within said inside diameter so that said die actuating member can rotate about said die member, the die actuating member having camming surfaces formed in said inside diameter and arranged so that when undergoing said rotation in a first rotational direction said camming surfaces interact with said crimping dies for effecting said movement thereof toward said crimping station.

5. The tool according to claim 4 wherein said axis of said inside diameter of said die actuating member is co-axial with said major axis and said longitudinal axes of said die ways are substantially perpendicular to said major axis.

6. The tool according to claim 5 including a first cam follower associated with said die actuating member and a first cam arranged to move within said frame in a first linear direction to engage said first cam follower and effect said rotation of said die actuating member in said first rotational direction.

7. The tool according to claim 1 wherein said die actuating member is arranged to rotate in a first rotational direction to effect said movement of said crimping dies toward said crimping station and into said crimping engagement, wherein said die actuating member has a cam follower associated therewith and said tool includes a first cam arranged to move in a first linear direction to engage said first cam follower and effect said rotation of said die actuating member in said first rotational direction.

8. The tool according to claim 7 wherein said first cam follower has a neutral position where said crimping dies are not in said crimping engagement and a closed position where said crimping dies are in said crimping engagement, so that as said first cam moves in said first linear direction and engages said first follower, said first follower is moved from its neutral position to its closed position.

9. The tool according to claim 8 including bias means for urging said first follower into said neutral position so that as said first cam moves in said first linear direction and engages said first follower and moves said first follower from its neutral position to its closed position, further movement of said first cam in said first linear direction causes said first follower to disengage said first cam and return to said neutral position.

10. The tool according to claim 9 wherein said first cam is arranged so that after said further movement thereof and upon moving said first cam in a second linear direction opposite to said first linear direction, said cam engages said first follower and moves it away from both said neutral and closed positions until said follower disengages said first cam and returns to said neutral position under the urging of said bias means.

11. The tool according to claim 10 wherein said first cam includes a front cam surface that engages said first follower during a portion of said movement in said first linear direction and a back cam surface, substantially opposite said front cam surface that engages said first follower during a portion of said movement in said second linear direction.

12. The tool according to claim 1 wherein said terminal feed mechanism includes a guide member having a track for positioning and guiding said carrier strip so that the axis of a first terminal on said carrier strip is substantially parallel with said major axis, including means for moving said carrier strip along said track thereby moving said first terminal into said position within said crimping station.

13. The tool according to claim 12 wherein said guide member is pivotally attached to said frame and arranged for pivotal movement away from and toward said crimping apparatus in a plane that is substantially parallel with said major axis so that said terminal can be pivoted away from said crimping station, then moved along said track by said means for moving until the axis of said terminal is adjacent said major axis, then pivoted toward said crimping station into said position.

14. The tool according to claim 13 wherein said guide member includes a second follower associated therewith and said tool includes a slide arranged to move within said frame in a first linear direction and in a second linear direction opposite to said first linear direction, said slide having a cam track therein in operational engagement with said second follower and arranged so that movement of said slide in said first and second linear directions causes said guide member to undergo said pivotal movement away from and toward said crimping apparatus, respectively.

15. The tool according to claim 14 wherein said means for moving comprises a feed dog adjacent said track and having an abutting member associated therewith that is engageable by said slide so that when said slide is undergoing said movement in said first linear direction, for at least a portion of said movement, said slide moves said feed dog into engagement with said carrier strip and moves said carrier strip along said track.

16. The tool according to claim 14 wherein said die actuating member is arranged to rotate in a first rotational direction to effect said movement of said crimping dies toward said crimping station, wherein said die actuating member has a cam follower associated therewith and said tool includes a first cam arranged to move in a first linear direction to engage said first cam follower and effect said rotation of said die actuating member in said first rotational direction, wherein said first cam is rigidly attached to and is carried by said slide.

* * * * *